(12) United States Patent
Hobeika et al.

(10) Patent No.: US 8,455,105 B2
(45) Date of Patent: Jun. 4, 2013

(54) ASYMMETRIC MULTI-LAYER COMPOSITES AND PROCESSES FOR PRODUCING THE SAME

(75) Inventors: Sven Hobeika, Solingen (DE); Olaf Zöllner, Leverkusen (DE); Peter Capellen, Krefeld (DE); Roderich Kammerer, Bad Honnef (DE)

(73) Assignee: Bayer Intellectual Property GmbH, Monheim (DE)

( * ) Notice: Subject to any disclaimer, the term of this patent is extended or adjusted under 35 U.S.C. 154(b) by 897 days.

(21) Appl. No.: 12/370,634

(22) Filed: Feb. 13, 2009

(65) Prior Publication Data

US 2009/0212587 A1 Aug. 27, 2009

(30) Foreign Application Priority Data

Feb. 23, 2008 (DE) .................. 10 2008 010 752

(51) Int. Cl.
*B32B 9/04* (2006.01)
(52) U.S. Cl.
USPC ..... 428/447; 428/412; 428/423.1; 428/423.7; 428/424.2; 428/425.5
(58) Field of Classification Search
USPC ............. 428/412, 423.1, 423.7, 424.2, 425.5, 428/447
See application file for complete search history.

(56) References Cited

U.S. PATENT DOCUMENTS

| | | | |
|---|---|---|---|
| 3,707,397 A | 12/1972 | Gagnon | |
| 4,278,804 A | 7/1981 | Ashby et al. | |
| 4,322,476 A * | 3/1982 | Molari, Jr. | 428/412 |
| 4,373,061 A | 2/1983 | Ching | |
| 4,410,594 A | 10/1983 | Olson | |
| 5,041,313 A | 8/1991 | Patel | |
| 5,391,795 A | 2/1995 | Pickett | |
| 5,679,820 A | 10/1997 | Pickett | |
| 5,712,325 A | 1/1998 | Lewis et al. | |
| 5,817,715 A | 10/1998 | Medford | |
| 5,990,188 A | 11/1999 | Patel et al. | |
| 2010/0119802 A1 * | 5/2010 | Ford et al. | 428/220 |

FOREIGN PATENT DOCUMENTS

| | | |
|---|---|---|
| DE | 3044450 A1 | 6/1981 |
| DE | 69717959 T2 | 6/1998 |
| DE | 102004014023 A | 10/2005 |
| EP | 1087001 A2 | 3/2001 |

* cited by examiner

*Primary Examiner* — Edward Cain
(74) *Attorney, Agent, or Firm* — Novak Druce Connolly Bove + Quigg LLP

(57) ABSTRACT

Multi-layer composites comprising: (a) a first scratch-resistant coating layer comprising a first coating (primer); (b) a thermoplastic layer; and (c) a second scratch-resistant coating layer comprising a second coating (primer); wherein the first scratch-resistant coating layer and the second scratch-resistant coating layer are disposed on opposing sides of the thermoplastic layer; wherein the first coating and the second coating are not the same; and wherein the first scratch-resistant coating layer and the second scratch-resistant coating layer are selected such that a multi-layer composite having the first scratch-resistant layer disposed on both sides of the thermoplastic layer has a lower critical impact speed for tough/brittle transition at −30° C. according to DIN EN ISO 6603-1 than a multi-layer composite having the second scratch-resistant layer disposed on both sides of the thermoplastic layer; processes for producing the same; and uses therefor.

28 Claims, No Drawings

ASYMMETRIC MULTI-LAYER COMPOSITES AND PROCESSES FOR PRODUCING THE SAME

BACKGROUND OF THE INVENTION

Thermoplastic substrates, such as, for example, polycarbonates, are in general characterized by many advantageous properties, which include clarity, high ductility, high heat distortion point, and also dimensional stability. Many of these materials are transparent and are in some cases employed as a substitute for glass in commercial uses.

While thermoplastic resins have the advantageous properties described above, they often show too low a resistance to abrasion and chemical solvents for some uses. Furthermore, like many other organic polymeric materials, they are also sensitive to degradation by ultraviolet light. This leads to yellowing and erosion of the substrate surface.

For these reasons, thermoplastic substrates, such as, for example, polycarbonate components, are often provided with a protective coating. In this context, precisely those protection systems which form both a mechanical protection against abrasion and scratching and an excellent protection against weathering influences, i.e. rain, temperature and, in particular, ultraviolet radiation (UV), are suitable for external use.

The coating systems which are suitable for this and are used, for example, for polycarbonate sheets in the construction sector, for headlamp cover screens of polycarbonate or also in the field of polycarbonate automobile glazing can be roughly divided into three categories.

First, (a) heat curing coating systems based on a polysiloxane coating, which can be either single-layered or multi-layered (with a "merely adhesion-promoting primer layer" between the substrate and polysiloxane topcoat). These are described, inter alia, in U.S. Pat. Nos. 4,278,804, 4,373,061, 4,410,594, 5,041,313 and EP-A-1 087 001. There are mentioned by way of example here the commercially obtainable systems of Momentive Performance Materials Inc. Wilton, Conn. USA, such as PHC 587; PHC 587B; SHP 401 (primer)/AS 4000 (topcoat) or also SHP 401 (primer)/AS 4002 (topcoat) as well as KASI Flex® or Sun Flex®, both from KRD Coatings, Geesthacht, Germany, or Silvue® MP 100, SDC Coatings, Germany, or Sicralan® MRL from GFO, Schwäbisch Gmünd, Germany. A "merely adhesion-promoting primer layer" between the substrate and polysiloxane topcoat is a primer layer comprising an adhesion-promoting polymer and optionally one or more UV-absorbers in low concentration and/or with low layer thickness. For conventional, thick primer systems, these layer thicknesses of between about 0.3-1.5 µm are too low.

However, these are not yet adequately weather-resistant for some cases of use. To achieve a longer life of the components, improved systems have been developed here. A successful variant is the use of the adhesive primer necessary for the siloxane-based topcoat as a UV protection primer by adding a UV absorber to this and applying it in a higher layer thickness.

Second, (b) heat curing multi-layer systems having a UV protection primer and a topcoat based on a polysiloxane coating. Suitable systems are known e.g. from U.S. Pat. Nos. 5,391,795 and 5,679,820 and "Paint & Coating Industry; July 2001 page 64 to 76: The Next Generation in Weatherable Hardcoats for Polycarbonate" by George Medford/General Electric Silicones, LLC, Waterford, N.Y.; James Pickett/The General Electric Co., Corporate Research and Development, Schenectady, N.Y.; and Curt Reynolds/Lexamar Corp., Boyne City, Mich. A commercially obtainable system is the SHP470 (V protection primer)/AS4700 (topcoat) system from Momentive Performance Materials mentioned therein. This SHP470 is an adhesion-promoting UV protection primer based on polymethyl methacrylate, inter alia with 1-methoxy-2-propanol and diacetone alcohol as the solvent and dibenzoylresorcinol as the UV absorber. The AS4700 topcoat is a polysiloxane topcoat with a silylated UV absorber.

Further useful systems are those described in pending U.S. patent application Ser. No.: 12/254,387, the entire contents of which are incorporated herein by reference, comprising:

(a) 100,000 parts by weight of a primer composition comprising a binder material (a1), a primer solvent (a2) and a UV absorber (a3), wherein the primer composition is suitable as a adhesion-promoting agent between a thermoplastic substrate and a siloxane-based top coat;

(b) 0 to 900,000 parts by weight of a solvent, and (c) 1 to 3000 parts by weight of a compound according to the general formula (I):

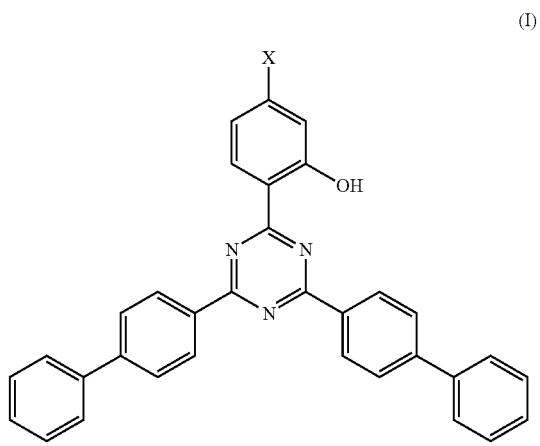

(I)

wherein X represents a moiety selected from the group consisting —$OR^6$, —$OCH_2CH_2OR^6$, —$OCH_2CH(OH)CH_2OR^6$ and —$OCH(R^7)COOR^8$, wherein $R^6$ represents a branched or unbranched $C_1$-$C_{13}$ alkyl, $C_2$-$C_{20}$ alkenyl, $C_6$-$C_{12}$ aryl or —O—$C_1$-$C_{18}$ alkyl, $R^7$ represents H or a branched or unbranched $C_1$-$C_8$ alkyl, and $R^8$ represents a $C_1$-$C_{12}$ alkyl, a $C_2$-$C_{12}$ alkenyl or a $C_5$-$C_6$ cycloalkyl, and wherein the composition has a viscosity of 40 s to 140 s measured in accordance with DIN EN ISO 2431 at 23° C. and with a 2 mm cup. Both layers, i.e. primer and top coating together assume the function here of the UV protection finish.

Third, (c) UV curing coating systems, e.g. based on acrylate, urethane acrylate or acrylosilane, which optionally contain fillers for improving the scratch resistance, can likewise form an adequate weather protection because of their relatively wide application layer thickness window. Such systems are known and are described, inter alia, in U.S. Pat. No. 3,707,397 or DE 69 71 7959, U.S. Pat. Nos. 5,990,188, 5,817, 715 and 5,712,325. The commercially obtainable UVHC 3000, UVHC 3000K and UVHC 3000S systems from Momentive Performance Materials and UVT 200 and UVT 610 from Redspot are examples of such a suitable coating.

The weather-resistant scratch protection layers (a) and the highly weather-resistant scratch protection layers (b) and (c) are also used on other thermoplastic substrates, such as e.g. polycarbonate blends.

In many planar uses with one side exposed to weather, not only is a protective layer required on this outside, but the inside which is exposed less to weather must likewise be protected against scratching, the action of chemicals and, to a reduced extent compared with the outside, also against UV attack. In these cases the inside of the component is likewise co-coated directly, i.e. with the same coating system.

DE 3044450 A1 relates to an impact- or shock-resistant laminate having a number of layers which absorb impact or shock chosen from polycarbonates, glasses and solid resin materials, including a backwards polycarbonate layer with respect to the direction of impact or shock, wherein this polycarbonate layer has, on the side opposite to the direction of impact, a scratch-resistant coating which is harder and more brittle than the underlying polycarbonate layer, and an intermediate layer, which is less fragile than the scratch-resistant coating, arranged between the backwards polycarbonate layer and the scratch-resistant coating, the layers being bonded to one another with a compatible adhesive.

DE 10 2004014023A1 relates to a composite screen of plastic having an inside and an outside for vehicle glazing, characterized in that that the inside screen and the outside screen are joined by a layer of thermoplastic polyurethane.

While the heat curing coating systems (a) are often not yet sufficiently weather-resistant, a dramatic drop in the toughnesses of the overall component, especially at low temperatures, is to be observed in the case of components provided similarly on both sides with scratch protection layers (b) and (c) which are highly weather-resistant. Low temperatures here means below $\leq 0°$ C., in particular $<-10°$ C.$\approx 0$ to about $-30°$ C. In puncture tests on components of polycarbonate and blends thereof with highly weather-resistant scratch-resistant coatings, a loss in low temperature toughness under dynamic load was found here after the coating on both sides.

BRIEF SUMMARY OF THE INVENTION

Thus, various embodiments of the present invention provide multi-layer composite constructions which have the desired weathering and scratch resistance properties and have the desired low temperature toughness.

The present invention includes a multi-layer composite including, in this sequence, layer A), layer B) and layer C), wherein
  layer A) is a scratch-resistant coating;
  layer B) is a thermoplastic;
  layer C) is a scratch-resistant coating;
characterized in that that layer A) is not the same as layer C), and wherein a multi-layer composite having layers A) arranged on both sides of layer B) has a lower critical impact speed for tough/brittle transition at $-30°$ C. in accordance with DIN EN ISO 6603-1 than a multi-layer composite having layers C) arranged on both side of layer B).

In other words, the invention therefore includes a multi-layer composite including, in this sequence, layer A), layer B) and layer C), wherein
  layer A) is a scratch-resistant coating;
  layer B) is a thermoplastic;
  layer C) is a scratch-resistant coating;
characterized in that that layer A) is not the same as layer C), and wherein layer A) in a multi-layer composite having identical layers A) and C) has a lower critical impact speed for tough/brittle transition at $-30°$ C. in accordance with DIN EN ISO 6603-1 than layer C) in a multi-layer composite having identical layers A) and C).

Without being bound to any particular theory, the present inventors believe one reason for the improved properties of the subject matter of the present invention may include that the coating in the zone subject to tensile forces predominantly determines the fracture behaviour. The outside exposed to pressure (contact area of the impactor) influences the fracture behaviour to only a minor degree.

The present invention also includes weathering-resistant glazing and exterior components having an excellent weather resistance and very good low temperature toughness and production thereof, in particular a multi-layer composite including, in this sequence, layer A), layer B) and layer C), wherein
  layer A) is a scratch-resistant coating;
  layer B) is a thermoplastic;
  layer C) is a scratch-resistant coating;
characterized in that that layer A) is not the same as layer C), and wherein a multi-layer composite having layers A) arranged on both sides of layer B) has a lower critical impact speed for tough/brittle transition at $-30°$ C. in accordance with DIN EN ISO 6603-1 than a multi-layer composite having layers C) arranged on both side of layer B).

The present invention furthermore includes a multi-layer construction having two different sides, an outside and an inside, also called an asymmetric construction in the following. This asymmetric multi-layer construction comprises the following sequence of layers, starting from the outside to the inside: abrasion-resistant, weather-resistant coating/thermoplastic substrate/abrasion-resistant coating, and is characterized in that the outside has excellent weathering and scratch resistance properties, while the overall construction has a high low temperature toughness.

The present invention furthermore includes a process for the production of this multi-layer construction according to the invention, and the use as a glazing material, such as, for example, automobile glazing or architecture glazing, and windshields, i.e. automobile or motor cycle screens, column and vehicle body covers and shields, the outside of the asymmetric construction predominantly being exposed to the influence of external weathering, One embodiment of the present invention includes a multi-layer composite comprising:
  (a) a first scratch-resistant coating layer comprising a first coating (primer);
  (b) a thermoplastic layer; and
  (c) a second scratch-resistant coating layer comprising a second coating (primer);
  wherein the first scratch-resistant coating layer and the second scratch-resistant coating layer are disposed on opposing sides of the thermoplastic layer;
  wherein the first coating and the second coating are not the same;
  and wherein the first scratch-resistant coating layer and the second scratch-resistant coating layer are selected such that a multi-layer composite having the first scratch-resistant layer disposed on both sides of the thermoplastic layer has a lower critical impact speed for tough/brittle transition at $-30°$ C. according to DIN EN ISO 6603-1 than a multi-layer composite having the second scratch-resistant layer disposed on both sides of the thermoplastic layer.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a first coating" herein or in the appended claims can refer to a single first coating or more than one first coating. Additionally, all numerical values, unless otherwise specifically noted, are understood to be modified by the word "about."

Sample parts coated on one side with highly weather-resistant systems accordingly show tough behavior on the outside or weather side in a puncture test according to DIN EN ISO 6603.

In other words, the object described can be achieved with an asymmetric multi-layer construction which comprises a thermoplastic substrate, which is coated on the outside with a coating A of the "highly weather-resistant scratch-resistant coating" category and is coated on the inside with a coating B of the "scratch-resistant coating" category, which only insignificantly adversely influences the low temperature toughness of the thermoplastic substrate.

This insignificant adverse influencing of the low temperature toughness is characterized in that a coating on both sides of the thermoplastic substrate with this coating B of the "scratch-resistant coating" category still results in a critical impact speed for tough/brittle transition at −30° C. in accordance with DIN EN ISO 6603 of >2.5 m/s, in particular >3 m/s, and therefore also ensures correspondingly tough behavior of the asymmetric construction according to the invention.

The commercial coating systems SHP401/AS4000, PHC587 and its derivatives (PHC 587 B; PHC 587 C) and the coating system SHP470/AS4700 with a primer layer thickness <ca. 1.5 μm (also referred to as a "thin layer" herein) from Momentive Performance Materials show an adequate low temperature toughness, characterized in that a coating on both sides of a thermoplastic substrate, such as polycarbonate, with these coatings still results in an impact speed for tough/brittle transition at −30° C. in accordance with DIN EN ISO 6603 of >m/s.

However, the weathering properties of these systems are below the requirements necessary here, and for this reason they cannot be used for layer A.

In contrast, the commercial system SHP 470/AS4700 with a primer layer thickness >ca. 2 μm (also referred to as a "thick layer" herein) indeed meets the weathering requirements, but reduces the low temperature toughness of the substrate to an unacceptable level, a coating on both sides of a thermoplastic substrate, such as polycarbonate, with this coating resulting in an impact speed for tough/brittle transition at −30° C. in accordance with DIN EN ISO 6603 of <3m/s. This coating with this layer thickness accordingly is not suitable for layer C.

A loss of low temperature toughness under dynamic load was likewise found after coating on both sides of a thermoplastic substrate, such as polycarbonate, with UV curing highly weather-resistant systems, such as, for example, UVHC 3000. This system therefore also is not suitable for layer C.

Definitions

In the context of the present invention, the term "coating" refers to a system comprising a topcoat and optionally a primer layer.

In the context of the present invention, the phrase "the first coating and the second coating are not the same" can refer to coating layers which differ either with regard to the systems chosen, and/or with regard to the thickness of their primer layers and/or the thickness of the topcoat layers.

In the context of the present invention, the term "thin layer" refers to a coating layer comprising an UV-stabilized coating but having a layer thickness too small for efficient outside performance (<ca. 1.5 μm).

In the context of the present invention, the term "thick layer" refers to a coating layer comprising an UV-stabilized coating and having a layer thickness which gives sufficient outside performance (>ca. 2 μm).

In the context of the present invention, the expression multi-layer composite means a cohesive composite of a plurality of layers.

In the context of the present invention, the expression thermoplastic substrate means polycarbonate, polyester carbonate, polyester (such as, for example, polyalkylene terephthalate), polyphenylene ether, graft copolymers (such as, for example, ABS) and mixtures thereof. The suitable thermoplastics can additionally contain fillers, such as e.g. glass fibres or mineral fillers, and impact modifiers, mould release agents and stabilizers.

There are mentioned by way of example but not by way of limitation, inter alia, Makrolon® AG 2677 (medium-viscosity bisphenol A polycarbonate with UV stabilizer and mould release agent; MFR 13 g/10 min in accordance with ISO 1133 at 300° C. under 1.2 kg), Makrolon® AL 2647 (medium-viscosity bisphenol A polycarbonate with UV stabilizer and mould release agent; MFR 13 g/10 min in accordance with ISO 1133 at 300° C. under 1.2 kg), Makrolon® 3103 (medium-viscosity bisphenol A polycarbonate with UV stabilizer and mould release agent; MFR 6.5 g/10 min in accordance with ISO 1133 at 300° C. under 1.2 kg), Makrolon® 2405 (medium-viscosity bisphenol A polycarbonate with UV stabilizer and mould release agent; MFR 20 g/10 min in accordance with ISO 1133 at 300° C. under 1.2 kg), Bayblend® T 95MF (PC+ABS blend with a mineral filler content, MFR 18 g/10 min in accordance with ISO 1133 at 260° C. under 5 kg), Makroblend® 7665 (PC+PET blend with a mineral filler content, MFR 4 g/10 min in accordance with ISO 1133 at 260° C. under 5 kg).

In the context of the present invention, the expression coating B refers to a heat curing coating system described above based on a polysiloxane coating (a) or a thin layer of the heat curing multi-layer system described above with a UV protection primer and a topcoat based on a polysiloxane coating (b).

In the context of the present invention, the expression coating A refers to a thick layer of the heat curing multi-layer system described above with a UV protection primer and a topcoat based on a polysiloxane coating (b), or the UV curing coating system described above based on acrylate, urethane acrylate or acrylosilane (c).

The present invention furthermore relates to the multi-layer composite according to the invention, wherein SHP 470 (thick layer)/AS4700 or UVHC 3000 serves as layer A and SHP 470 (thin layer)/AS4700 or PHC 587, PHC 587B or PHC 587 C or SHP401/AS4000 serves as layer C.

Description of the systems:

PHC 587, PHC587B, PHC587C or SHP 401/AS 4000: comprising
  a. organosilicon compounds of the general formula $R'_n Si(OR)_{4-n}$ or partial condensates thereof;
  b. inorganic nanoparticles, preferably of $SiO_2$;
  c. alcohol-based solvent;
  d. optionally UV absorber, preferably silylated UV absorber and an organic adhesion promoter based on acrylate either as an additive in the coating containing the organosilicon compound or as a separate primer coating formulation which is applied to the substrate, allowed to dry in air and dried, before the coating with components a to d is then applied. R' and R here represent, for example, organic radicals, such as aliphatic radicals (alkyl), aromatic radicals (phenyl or naphthyl) or radicals having an aliphatic and aromatic content (e.g. benzyl).

SHP 470/AS 4700 and SHP 470 FT 2050/AS 4700 or similar systems: comprising a primer coating and a polysiloxane-based topcoat, wherein the primer coating comprises:

a. organic binder material which renders possible an adhesion promotion between the PC and a polysiloxane-based coating;
b. V absorber;
c. solvent, wherein the topcoat comprises the following:
a. organosilicon compounds of the general formula $R'_n Si(OR)_{4-n}$ or partial condensates thereof,
b. inorganic finely divided compound, preferably $SiO_2$;
c. an alcohol-based solvent;
d. optionally UV absorber and further additives.

R' and R can each independently represent, for example, organic radicals, such as aliphatic radicals (alkyl), aromatic radicals (phenyl or naphthyl) or radicals having an aliphatic and aromatic content (e.g. benzyl)

UVUC 3000: comprises
a. one or more polymer precursors chosen from one of the groups consisting of components $a_1$ and $a_2$, where
  $a_1$ oligomers having at least one acrylate function, or mixtures thereof
  $a_2$ reactive thinner having at least one acrylate function, or mixtures of corresponding reactive thinners;
b. optionally finely divided inorganic compound, preferably $SiO_2$ particles;
c. photoinitiator;
d. UV absorber;
c. solvent.

Suitable UV absorbers include derivatives of the following general groups, benzotriazoles, oxalanilides, 2-cyanacrylates, benzylidene malonates and formamidines, benzophenones, preferably 2-hydroxybenzophenones and dibenzoylresorcines, and triazines, preferably 2-(2-hydroxyphenyl)-1,3,5-triazines.

The present invention furthermore relates to the multi-layer composite according to the invention for sheet and injection moulding components for external uses, such as architecture glazing, automobile glazing or vehicle body covering components. These are e.g. side shields of motor vehicles, side windows, rear windows, or roof uses.

The toughness was evaluated here with the aid of a falling test based on the standard DIN EN ISO 6603-1. Analogously to the standard, a puncture test is carried out here with a varied falling energy, this being effected by varying the falling height at a constant falling weight. As a measure of the falling energy, the impact speed is measured directly by means of a light barrier and stated as the variable parameter.

In deviation from the standard, a combination of contact surface diameter and mandrel diameter of 40 mm and, respectively, 20 mm and a specimen size of 50×50 mm² are used. The falling weight was 13 kg and the test temperature was −30° C.

The fact that polymeric materials show a transition from tough to brittle fracture behaviour on variation of certain parameters (e.g. temperature, deformation rate, notch radius or the like) was used to characterize the toughness. In the present case, the impact speed of the mandrel on the upper side of the specimen was used as the variable parameter.

As a characteristic parameter for the toughness, a "critical impact speed" has been defined, which is obtained from the geometric mean of the highest speed with tough and smallest speed with brittle fracture behaviour:

$$v_{crit} := 0.5 * [\max(v_{tough}) + \min(v_{brittle})].$$

To determine this toughness parameter, the critical impact speed was varied within a suitable range and the fracture behaviour (tough/brittle) belonging to a chosen speed was determined. The nature of the fracture (tough/brittle fracture) was determined with the aid of the fracture pattern of the impacted test specimen. Tough fracture here is both plastic deformation without cracking (according to the standard) and puncture of the test specimen (in deviation from the standard) if it remains in one piece—breaking up of the specimen into two or more parts is evaluated as brittle fracture.

The critical impact speeds measured are between 2-2.5 m/s and 13 m/s. Specimens which also show a brittle fracture with a minimal impact speed are generally evaluated as brittle, and the critical impact speed is stated as "<2.5 m/s".

Each multi-layer construction is therefore characterized by the critical impact speed and can therefore be compared with other systems and evaluated.

The thickness of the test specimen of course influences the deformation and fracture behaviour under mechanical stress. In particular, the absolute measurement values (maximum force, elongation at break, . . . ) show a dependency on the specimen thickness and cannot be compared directly with one another for test specimens of different thickness. In the context of the present invention, specimens having a thickness of 5 mm, the behaviour of which can be compared with one another and the thickness of which lies within a size typical of many uses, such as glazing, were therefore used.

The relative differences in the toughness of the various systems—in the form of the position of the tough/brittle transition or the critical impact speed—can also be applied, however, to other sample thicknesses. The relative toughness differences between the various coating systems and constructions determined here by way of example on test specimens 5 mm thick therefore also apply to specimens of larger or smaller thicknesses.

The expression zone subjected to tensile forces here means the side of the specimen which lies on the opposite side to the impactor and is therefore subjected to tensile stress in the puncture test. In contrast, pressure zone designates the region of the specimen under the impactor on the impact side, where a pressure loading mostly takes place.

In a further embodiment, the present invention relates to such a multi-layer composite, characterized in that the scratch-resistant coating in layer A) has a critical impact speed lower than the scratch-resistant coating in layer C) by more than or equal to 2 m/s. Preferably, the critical impact speed is lower by more than or equal to 1.5 m/s, in particular more than or equal to 2 m/s, especially by more than or equal to 2.5 m/s.

In a further embodiment, the present invention relates to such a multi-layer composite, characterized in that the scratch-resistant coating in layer C), when the thermoplastic substrate is coated on both sides, has a critical impact speed for tough/brittle transition at −30° C. in accordance with DIN EN ISO 6603-1 at a thickness of the multi-layer composite of 5 mm of greater than 2.5 m/s, in particular greater than 3 m/s, especially greater than 3.3 m/s if layer C lies in the zone subject to tensile forces.

In a further embodiment, the present invention relates to a process for the production of a multi-layer composite including layer A), layer B) and layer C), including the steps i) positioning of layer B) such that one edge of layer B) is lower than the higher edge; ii) flow coating of layer B) on the upper side of the higher edge with liquid scratch-resistant coating to form a layer A); iii) flow coating of layer B) on the under-side of the higher edge with liquid scratch-resistant coating to form a layer C); and iv) drying of the coatings. This process is suitable in particular for the production of the multi-layer composite according to the invention. In a further embodiment, the present invention relates to this process, characterized in that steps ii) and iii) are carried out substantially at the same time, in particular at an interval of from 1 to 30 min, 1 to 10 min, 2 to 5 min or 2 to 3 min.

Production of the multi-layer construction (description of the production of the substrate; description of the coating process)

Shaped articles can be produced from the thermoplastic substrates described above by injection molding and by extrusion. The processes for this are known and are described in "Handbuch Spritzgießen", Friedrich Johannnaber/Walter Michaeli, Munich; Vienna: Hanser, 2001, ISBN 3-446-15632-1 or "Anleitung zum Bau von Spritzgießwerkzeugen", Menges/Michaeli/Mohren, Munich; Vienna: Hanser, 1999, ISBN 3-446-21258-2. Injection molding is a moulding process employed in plastics processing.

Moldings which can be used directly can be produced economically in large piece numbers by this process. For this, using an injection molding machine, the particular material, or the molding composition, is plasticized in an injection unit and injected into an injection mold. The hollow space, the cavity, of the mold determines the shape and the surface structure of the finished component.

Injection molding here includes all injection molding processes, including multicomponent injection molding and injection-compression processes.

The injection molding and injection-compression variants known in plastics processing are employed for the production of one- and multi-component moldings of plastic. Conventional injection molding processes without the injection-compression technique are used in particular for the production of smaller injection molded parts in which short flow paths occur and moderate injection pressures can be used. In conventional injection molding processes, the plastics composition is injected into a cavity formed between two closed mold plates of fixed position and solidifies there.

Injection-compression processes differ from conventional injection molding processes in that the injection and/or solidification operation is carried out while moving the mold plates. In the known injection-compression process, the mold plates are already opened somewhat before the injection operation, in order to compensate the shrinkage which occurs during the later solidification and to reduce the injection pressure required. A pre-enlarged cavity is therefore already present at the start of the injection operation. Flash faces of the mold still guarantee an adequate tightness of the pre-enlarged cavity even with the mold plates opened somewhat. The plastics composition is injected into this pre-enlarged cavity, and during this or thereafter is compressed while the mold is moved in the closing direction. For the production in particular of large-area and thin-walled mouldings with long flow paths, the more involved injection-compression technique is preferred, or possibly absolutely necessary. Only in this manner is a reduction in the injection pressures required for large moldings achieved. Furthermore, stresses or distortion in the injection molded part which occur as a result of high injection pressures can be avoided by injection-compression. This is important in particular for the production of plastics for optical uses, such as, for example, glazing (windows) in motor vehicles, since increased requirements of absence of stresses are to be adhered to in plastics for optical uses.

Multi-component plastics moldings can be produced by surface injection or over-injection of the second plastics component on to the pre-fabricated first component of the molding. For this, a surface injection mold plate (a second cavity in the turntable mold) is mounted on the already prefabricated first component of the plastics molding, a free space for formation of the second component existing between the first component of the plastics molding and the surface injection mold plate.

Makrolon®, Bayblend® and Makroblend® must be dried before processing, since moisture in the melt leads to surface defects and to an increased molecular weight degradation. Makrolon®, Bayblend® and Makroblend® are dried in dryers suitable for this. The drying time of granules which have become moist depends largely on the nature and type of the drying apparatus and can be between 2 and 12 hours, depending on the drying output.

All modern injection molding machines are suitable for processing Makrolon®, Bayblend® and Makroblend®. The usual material temperatures during processing are in general between 280 to 320° C. for Makrolon®, and between 240 to 280° C. for Bayblend® and 240 to 280° C. for Makroblend®.

The molds should be temperature-controlled intensively and uniformly. The mold temperature should be at least 80° C. for Makrolon and between 60° C. and 80° C. for the Makro-® and Bayblend® types in order to achieve parts which have the lowest possible stress and a good surface.

The components produced are stored in additive-free polyethylene bags until coated, in order to avoid contamination.

In extrusion, plastics or other viscous curable materials are forced through a die in a continuous process. For this, the plastic—the extrudate—is first melted and homogenized by an extruder by means of heating and internal friction. The pressure necessary for flowing through the die is furthermore built up in the extruder. After emerging from the die, the plastic solidifies, usually in a water-cooled calibrating unit. Application of vacuum has the effect that the profile is pressed against the calibrator wall and shaping is thus concluded. Thereafter, a cooling zone in the form of a cooled water-bath often also follows. The cross-section of the geometric body formed in this way corresponds to the die or calibrating unit used. Possible production tolerances vary in the range of ±0.05 mm.

The highly viscous Makrolon® 3103 type is particularly suitable for extrusion processing. Sheets can be produced therefrom by known processing processes. Almost exclusively single-screw extruders are employed. The temperature programme is achieved via a descending cylinder temperature profile from the hopper to the die of from 280° C to 250° C. The material temperature at the die exit is 240° C. to 300° C., depending on the processing process. The sheet is then rolled out on a polishing calender. The sheets are then provided with a laminating film on both sides and milled into transportable sheets.

The sample sheets are prepared from the extruded goods by suitable processes. These are, inter alia, sawing, cutting, stamping, milling and laser cutting.

Coating

Description of Coating Processes:

The primer and topcoat coatings can be applied by flow coating or spraying. The flow coating process is particularly preferred because of the resulting high optical quality. The flow coating process can be carried out manually with a hose or suitable coating head or automatically in flow-through via flow coating robot and optionally slot dies.

In this case, the components can be coated either while suspended or while mounted in an appropriate product holder.

For larger and/or 3D components, the part to be coated is suspended or mounted in a suitable product holder.

For small parts, coating can also be carried out by hand. In this case, the liquid primer or coating solution to be used for coating is poured over the sheet in the longitudinal direction starting from the upper edge of the small part, while at the same time the starting point of the coating on the sheet is guided from left to right over the sheet width. The coated sheets were dried in air and cured according to the particular manufacturer's instructions while suspended vertically on a clamp.

The invention will now be described in further detail with reference to the following non-limiting examples.

EXAMPLES

In the following, the amounts are based on wt. %, unless stated otherwise.

All the solvents were obtained as technical-grade goods and were employed without drying.

Pretreatment/Cleaning of the Sample Components

Before coating, the polycarbonate sheets were blasted with ionized air to remove adhering contamination.

Determination of the Solids Content (Method A):

The solids content of the coatings was determined with the aid of the Sartorius MA40 solids tester, a weighed coating sample being evaporated at 140° C. until constant weight was achieved. The solids content is then obtained in per cent from the quotient of the weight after to the weight before the evaporation. In the simplest case, the solids content of the coating after curing of the coating here is the coating weight minus the solvent weight.

Determination of the Layer Thickness (Method B):

The layer thickness of the cured coatings was determined via white light interference with the aid of the Eta SD30 measuring instrument from Eta Optik GmbH, Germany.

Determination of the Adhesion Properties (Method C):

The adhesion of the coatings was determined via the following tests a.) peeling off of adhesive tape (3M® 610 adhesive tape used) without and with cross-hatch (analogously to ISO 2409 or ASTM D 3359); b.) peeling off of adhesive tape after storage in boiling water for 4 h. Tests a) and b) are passed if no coating at all peeled off (rating 0 according to ISO 2409 or 5B according to ASTM D 3359). In ISO 2409 the rating 0 and in ASTM D 3359 5B means that no detachment is detectable Toughness The toughness was evaluated in this context with the aid of a falling test on the basis of the standard DIN EN ISO 6603-1.

Coating Procedure

The coating was carried out in a climatically controlled coating room under the particular instructions of the coating manufacturer at 23 to 25° C. and 40 to 48% rel. humidity. The sample sheets were cleaned with so-called iso-cloths (LymSat® from LymTech Scientific; saturated with 70% isopropanol and 30% deionized water), rinsed with isopropanol, dried in air for 30 min and blasted with ionized air.

The primers and coatings are processed in accordance with the manufacturer's instructions. The primers and coatings can be employed in the delivery state here, and also after dilution with suitable solvents in order the achieve the given layer thickness window.

Example 1

AS 4700/AS 4000 (According to the Invention)

A primer solution comprising the commercially obtainable high-build primer SHP 470 (solids content 9.90%) and a 1:1 solvent mixture of diacetone alcohol and 1-methoxy-2-propanol was prepared by initially introducing 300.0 g of SHP 470 (9.9 wt. % strength) into the mixing vessel and adding in each case 97.5 g of diacetone alcohol and 1-methoxy-2-propanol, while stirring.

This primer was applied on one side in the flow coating process to 5 mm polycarbonate sheets (injection moulded PC sheets in optical quality from Makrolon® AG 2677 (Bayer MaterialScience AG; medium-viscosity bisphenol A polycarbonate with UV stabilizer and mould release agent; MFR 13 g/10 min in accordance with ISO 1133 at 300° C. under 1.2 kg)) 10.5×15×0.5 cm in size.

Coating was carried out by hand. In this case, the liquid SHP470 primer to be used for coating is poured over the sheet in the longitudinal direction starting from the upper edge of the small part, while at the same time the starting point of the primer on the sheet is guided from left to right over the sheet width. The primed sheets were dried in air until dust dry and cured in a circulating air oven according to the particular manufacturer's instructions, while suspended vertically on a clamp. After cooling to room temperature, coating of the primed surface with AS 4700 was carried out. After drying in air until dust dry, the non-coated reverse can be coated with SHP 401 by the same working process. The sheets coated in this way were dried in air until dust dry, again according to the particular manufacturer's instructions.

The sheet primed with SHP 401 was then over-coated with AS 4000. After drying in air until dust dry, curing was carried out at 130° C. for 60 min in a circulating air oven.

The thickness of the transparent two-layer coating (primer SHP 470/topcoat AS4700) obtained in this way was determined by Method B, and the adhesion of the coating was determined via Method C.

Example 2

AS 4700/ PHC 587 (According to the Invention)

A primer solution comprising the commercially obtainable high-build primer SHP 470 (solids content 9.90%) and a 1:1 solvent mixture of diacetone alcohol and 1-methoxy-2-propanol was prepared by initially introducing 300.0 g of SHP 470 (9.9 wt. % strength) into the mixing vessel and adding in each case 97.5 g of diacetone alcohol and 1-methoxy-2-propanol, while stirring.

This coating was applied on one side in the flow coating process to 5 mm polycarbonate sheets (injection moulded PC sheets in optical quality from Makrolon® AG 2677 (Bayer MaterialScience AG; medium-viscosity bisphenol A polycarbonate with UV stabilizer and mould release agent; MFR 13 g/10 min in accordance with ISO 1133 at 300° C. under 1.2 kg)) 10.5×15×0.5 cm in size.

Coating was carried out by hand. In this case, the liquid SHP470 primer to be used for coating is poured over the sheet in the longitudinal direction starting from the upper edge of the small part, while at the same time the starting point of the primer on the sheet is guided from left to right over the sheet width. The primed sheets were dried in air until dust dry and cured in a circulating air oven according to the particular manufacturer's instructions, while suspended vertically on a clamp. After cooling to room temperature, coating of the primed surface with AS 4700 was carried out. After drying in air for 120 sec, the coating on the reverse is carried out with the primerless hardcoat PHC 587. After drying in air until dust dry, curing was carried out in a circulating air oven.

The coating properties were tested in accordance with Example 1.

Example 3

UVHC 3000/PHC 587 (According to the Invention)

A coating solution comprising commercially obtainable UVHC 3000 was applied on one side in the flow coating process to 5 mm polycarbonate sheets (injection moulded PC sheets in optical quality from Makrolon® AG2677 (Bayer MaterialScience AG; medium-viscosity bisphenol A polycarbonate with UV stabilizer and mould release agent; MFR 13 g/10 min in accordance with ISO 1133 at 300° C. under 1.2 kg) 10.5×15×0.5 cm in size.

Coating was carried out by hand. In this case, the UVHC 3000 to be used for coating is poured over the sheet in the longitudinal direction starting from the upper edge of the small part, while at the same time the starting point of the primer on the sheet is guided from left to right over the sheet width. This is conventionally diluted down before the flow coating in order to reduce the viscosity, Conventional solvents are, inter alia, methoxypropanol, diacetone alcohol or mixtures thereof. After an evaporation time of 5 min, the sheets were subjected to precuring at 75° C. for 6 min. UV curing was then carried out with a dose of ~6-8 J/cm$^2$ using a mercury-doped UV lamp (80 W/cm). After cooling to room temperature, coating of the non-coated side was carried out with PHC 587. The coated sheet was dried in air to dust dry according to the particular manufacturer's instructions, while suspended vertically on a clamp.

After evaporation at room temperature for 30 min, curing was carried out at 130° C. for 60 min in a circulating air oven.

The coating properties were tested in accordance with Example 1.

Example 4

SHP470 (Thick Layer)/AS 4700 on Both Sides (Comparative)

A primer solution comprising the commercially obtainable high-build primer SHP 470 (Momentive Performance Materials Inc. Wilton, Conn. USA), (solids content 9.90%) and a 1:1 solvent mixture of diacetone alcohol and 1-methoxy-2-propanol was prepared by initially introducing 300.0 g of SHP 470 (9.9 wt. % strength) into the mixing vessel and adding in each case 97.5 g of diacetone alcohol and 1-methoxy-2-propanol, while stirring.

This coating was applied on both sides in the flow coating process to 5 mm polycarbonate sheets (injection moulded PC sheets in optical quality from Makrolon® AG2677 (Bayer MaterialScience AG; medium-viscosity bisphenol A polycarbonate with UV stabilizer and mould release agent; MFR 13 g/10 min in accordance with ISO 1133 at 300° C. under 1.2 kg)) 10.5×15×0.5 cm in size.

Coating was carried out by hand. In this case, the liquid SHP470 primer to be used for coating is poured over the sheet in the longitudinal direction starting from the upper edge of the small part, while at the same time the starting point of the coating on the sheet is guided from left to right over the sheet width. For the coating on both sides, the reverse is coated directly after the front side.

The primed sheets were dried in air at room temperature for 30 min and cured at 125° C. for 15 min in a circulating air oven, while suspended vertically on a clamp.

After cooling to room temperature, coating of the primed surface with AS 4700 was carried out. For the coating on both sides, the reverse was coated directly after the front side.

The coated sheets were dried in air at room temperature for 30 min and cured at 130° C. for 60 min, while suspended vertically on a clamp.

The coating properties were tested in accordance with Example 1.

Example 5

UVHC 3000 on Both Sides (Comparative)

A coating solution comprising the commercially obtainable UVHC 3000 (Momentive Performance Materials Inc. Wilton, Conn. USA) was applied on one side in the flow coating process to 5 mm polycarbonate sheets (injection moulded PC sheets in optical quality from Makrolon® AG 2677 (Bayer MaterialScience AG; medium-viscosity bisphenol A polycarbonate with UV stabilizer and mould release agent; MFR 13 g/10 min in accordance with ISO 1133 at 300° C. under 1.2 kg)) 10.5×15×0 5 cm in size. Coating with UVHC 3000 was carried out by hand. This is conventionally diluted down before the flow coating in order to reduce the viscosity.

The UVHC 3000 to be used for coating is poured over the sheet in the longitudinal direction starting from the upper edge of the small part, while at the same time the starting point of the coating on the sheet is guided from left to right over the sheet width. Conventional solvents are, inter alia, methoxypropanol, diacetone alcohol or mixtures thereof After an evaporation time of 5 min, the sheets were subjected to precuring at 75° C. for 6 min. UV curing was then carried out with a dose of ~6-8 J/cm$^2$ using a mercury-doped UV lamp (80 W/cm). The sample sheet obtained in this way was now likewise flow-coated with UVHC 3000 on the non-coated reverse and, after an evaporation time of 5 min, the sheets were precured at 75° C. for 6 min. UV curing was then carried out with a dose of ~6-8 J/cm$^2$ using a mercury-doped UV lamp (80 W/cm).

The coating properties were tested in accordance with Example 1.

Example 6

PHC 587 on Both Sides (Comparative)

A coating solution comprising the commercially obtainable PHC 587 (Momentive Performance Materials Inc. Wilton, Conn. USA) was applied on both sides in the flow coating process to 5 mm polycarbonate sheets (injection moulded PC sheets in optical quality from Makrolon® AG 2677 (Bayer MaterialScience AG; medium-viscosity bisphenol A polycarbonate with UV stabilizer and mould release agent; MFR 13 g/10 min in accordance with ISO 1133 at 300° C. under 1.2 kg)) 10.5×15×0.5 cm in size.

Coating was carried out by hand. In this case, the primerless hardcoat PHC 587 to be used for coating is poured over the sheet in the longitudinal direction starting from the upper edge of the small part, while at the same time the starting point of the primer on the sheet is guided from left to right over the sheet width. For the coating on both sides, the reverse is coated directly after the front side. The coated sheets were dried in air at room temperature for 30 min and cured at 130° C. for 60 min, while suspended vertically on a clamp.

The coating properties were tested in accordance with Example 1.

Example 7

AS 4000 on Both Sides (Comparative)

A primer solution comprising the commercially obtainable SHP 401 (Momentive Performance Materials Inc. Wilton, Conn. USA) was applied on both sides in the flow coating process to 5 mm polycarbonate sheets (injection moulded PC sheets in optical quality from Makrolon® AG 2677 (Bayer MaterialScience AG; medium-viscosity bisphenol A polycarbonate with UV stabilizer and mould release agent; MFR 13 g/10 min in accordance with ISO 1133 at 300° C. under 1.2 kg)) 10.5×15×0.5 cm in size. Coating was carried out by hand. In this case, the liquid SHP401 primer to be used for coating is poured over the sheet in the longitudinal direction starting from the upper edge of the small part, while at the same time the starting point of the coating on the sheet is guided from left to right over the sheet width. For the coating on both sides, the reverse is coated directly after the front side.

The primed sheets were dried in air at room temperature for 30 min, while suspended vertically on a clamp.

These primed sheets were over-coated on both sides with AS4000 (polysiloxane-based topcoat containing UV absorber, from Momentive Performance Materials) in the flow-coating process. For the coating on both side, the reverse is coated directly after the front side. The sheets were then dried in air at room temperature for 30 min and cured at 130° C. for 60 min.

The coating properties were tested in accordance with Example 1.

Example 8

Outside SHP470 (Thick Layer)/AS 4700, Inside SHP470 (Thin Layer)/AS 4700 (According to the Invention)

Thick Outside Primer Layer:

A primer solution comprising the commercially obtainable high-build primer SHP 470 (Momentive Performance Materials Inc. Wilton, Conn. USA), (solids content 9.80%) and a 1:1 solvent mixture of diacetone alcohol and 1-methoxy-2-propanol was prepared by initially introducing 300.0 g of SHP 470 (9.8 wt. % strength) into the mixing vessel and adding in each case 100 g of diacetone alcohol and 1-methoxy-2-propanol, while stirring.

This coating was applied to the outside of the sheet in the flow coating process to 5 mm polycarbonate sheets (injection moulded PC sheets in optical quality from Makrolon® AG2677 (Bayer MaterialScience AG; medium-viscosity bisphenol A polycarbonate with UV stabilizer and mould release agent; MFR 13 g/10 min in accordance with ISO 1133 at 300° C. under 1.2 kg)) 10.5×15×0.5 cm in size.

Coating was carried out by hand. In this case, the liquid SHP470 primer to be used for coating is poured over the sheet in the longitudinal direction starting from the upper edge of the small part, while at the same time the starting point of the coating on the sheet is guided from left to right over the sheet width. For the coating on both sides, the reverse is coated directly after the front side.

Thin Inside Primer Layer:

A primer solution comprising the commercially obtainable high-build primer SHP 470 (Momentive Performance Materials Inc. Wilton, Conn. USA), (solids content 9.80%) and a 1:1 solvent mixture of diacetone alcohol and 1-methoxy-2-propanol was prepared by initially introducing 100.0 g of SHP 470 (9.8 wt. % strength) into the mixing vessel and adding in each case 195 g of diacetone alcohol and 1-methoxy-2-propanol, while stirring.

This coating was applied by hand to the inside of the sheet in the flow coating process, as described above.

The sheets coated in this way were dried in air until dust dry, according to the particular manufacturer's instructions. After cooling to room temperature, these primed sheets were over-coated on both sides with AS4700 in the flow-coating process. For the coating on both sides, the reverse is coated directly after the front side. After drying in air until dust dry, curing was carried out at 130° C. for 60 min in a circulating air oven.

The coating properties were tested in accordance with Example 1.

Example 9

Outside SHP470 (Thin Layer)/AS 4700, Inside SHP470 (Thick Layer)/AS 4700 (Comparative)

Thick Inside Primer Layer:

A primer solution comprising the commercially obtainable high-build primer SHP 470 (Momentive Performance Materials Inc. Wilton, Conn. USA), (solids content 9.80%) and a 1:1 solvent mixture of diacetone alcohol and 1-methoxy-2-propanol was prepared by initially introducing 300.0 g of SHP 470 (9.8 wt. % strength) into the mixing vessel and adding in each case 100 g of diacetone alcohol and 1-methoxy-2-propanol, while stirring.

This coating was applied to the inside of the sheet in the flow coating process to 5 mm polycarbonate sheets (injection moulded PC sheets in optical quality from Makrolon® AG2677 (Bayer MaterialScience AG; medium-viscosity bisphenol A polycarbonate with UV stabilizer and mould release agent; MFR 13 g/10 min in accordance with ISO 1133 at 300° C. under 1.2 kg)) 10.5×15×0.5 cm in size.

Coating was carried out by hand. In this case, the liquid SHP470 primer to be used for coating is poured over the sheet in the longitudinal direction starting from the upper edge of the small part, while at the same time the starting point of the coating on the sheet is guided from left to right over the sheet width. For the coating on both sides, the reverse is coated directly after the front side.

Thin Outside Primer Layer:

A primer solution comprising the commercially obtainable high-build primer SHP 470 (Momentive Performance Materials Inc. Wilton, Conn. USA), (solids content 9.80%) and a 1:1 solvent mixture of diacetone alcohol and 1-methoxy-2-propanol was prepared by initially introducing 100.0 g of SHP 470 (9.8 wt. % strength) into the mixing vessel and adding in each case 195 g of diacetone alcohol and 1-methoxy-2-propanol, while stirring.

This coating was applied by hand to the outside of the sheet in the flow coating process, as described above.

The sheets coated in this way were dried in air until dust dry, according to the particular manufacturer's instructions. After cooling to room temperature, these primed sheets were over-coated on both sides with AS4700 in the flow-coating process. For the coating on both sides, the reverse is coated directly after the front side. After drying in air until dust dry, curing was carried out at 130° C. for 60 min in a circulating air oven.

The coating properties were tested in accordance with Example 1.

Layer constructions of Examples 1 to 9:

TABLE 1

|  | Layer construction | | Solids content [%] | | | |
| --- | --- | --- | --- | --- | --- | --- |
|  | Inside | | Weather side | | Inside (only if different coatings on each side) | |
| Ex. | Weather side Impact side | Zone subject to tensile forces | Primer (%) | Topcoat (%) | Primer (%) | Topcoat (%) |
| 1 | SHP470/ AS4700 | SHP401/ AS4000 | 5.9 | 26.0 | 1.8 | 22.5 |
| 2 | SHP470/ AS4700 | PHC 587 | 5.9 | 26.0 |  | 20.7 |
| 3 | UVHC 3000 | PHC 587 |  | 40.0 |  | 21.6 |
| 4 | SHP470/ AS4700 | SHP470/ AS4700 | 5.7 | 26.0 |  |  |
| 5 | UVHC 3000 | UVHC 3000 |  | 34.6 |  |  |
| 6 | PHC 587 | PHC 587 |  | 20.7 |  |  |
| 7 | SHP401/ AS4000 | SHP401/ AS4000 | 1.8 | 22.5 |  |  |
| 8 | SHP470 (thick layer)/ AS4700 | SHP470 (thin layer)/AS4700 | 5.8 | 24.7 | 2.2 | 24.7 |
| 9 | SHP470 (thin layer)/ AS4700 | SHP470 (thick layer)/AS4700 | 2.2 | 24.7 | 5.8 | 24.7 |

Testing of the Coating According to the Specification of Examples 1 to 9:
Layer Thickness
The layer thickness is determined in accordance with Method B.
Adhesion
The adhesion is determined in accordance with Method C. The results of the testing are summarized in Table 2:

TABLE 2

|  | Layer construction | | Layer thickness [μm] | | | | Adhesion | |
| --- | --- | --- | --- | --- | --- | --- | --- | --- |
|  | Inside | | Weather side | | Inside | | | |
| Ex. | Weather side Impact side | Zone subject to tensile forces | Primer (μm) | Topcoat (μm) | Primer (μm) | Topcoat (μm) | Tape test | Boiling test |
| 1 | SHP470/ AS4700 | SHP401/ AS4000 | 2.5 | 8.1 | 0.8 | 8.0 | 5B | 4.0 h [5B] |
| 2 | SHP470/ AS4700 | PHC 587 | 2.0 | 5.8 |  | 6.5 | 5B | 4.0 h [5B] |
| 3 | UVHC 3000 | PHC 587 |  | 14.3 |  | 8.7 | 5B | 4.0 h [5B] |
| 4 | SHP470/ AS4700 | SHP470/ AS4700 | 2.0 | 6.1 | 2.0 | 6.5 | 5B | 4.0 h [5B] |
| 5 | UVHC 3000 | UVHC 3000 |  | 11 |  | 11 | 5B | 4.0 h [5B] |
| 6 | PHC 587 | PHC 587 |  | 6.0 |  | 6.0 | 5B | 4.0 h [5B] |
| 7 | SHP401/ AS4000 | SHP401/ AS4000 | 0.6 | 6.1 | 0.6 | 6.1 | 5B | 4.0 h [5B] |
| 8 | SHP470 (thick layer)/ AS4700 | SHP470 (thin layer)/ AS4700 | 2.4 | 7.0 | 0.5 | 7.0 | 5B | 4.0 h [5B] |
| 9 | SHP470 (thin layer)/ AS4700 | SHP470 (thick layer)/ AS4700 | 0.5 | 7.0 | 2.4 | 7.0 | 5B | 4.0 h [5B] |

Toughness
The toughness was evaluated in this context with the aid of a falling test on the basis of the standard DIN EN ISO 6603-1. Results of the Falling Test Based on DIN EN ISO 6603-1 for Examples 1 to 9:

TABLE 3

|  | Layer construction | | Falling tower | |
| --- | --- | --- | --- | --- |
|  | Inside | | | |
| Ex. | Weather side Impact side | Zone subject to tensile forces | $v_{crit}$ [m/s] | |
| 1 | SHP470/AS4700 | SHP401/AS4000 | 5.2 ± 0.1 | |
| 2 | SHP470/AS4700 | PHC 587 | 6.0 ± 0.1 | |
| 3 | UVHC 3000 | PHC 587 | 3.3 ± 0.1 | |
| 4 | SHP470/AS4700 | SHP470/AS4700 | <2.5 | brittle fracture at minimal speed |
| 5 | UVHC 3000 | UVHC 3000 | <2.5 | brittle fracture at minimal speed |
| 6 | PHC 587 | PHC 587 | 6.2 ± 0.5 | |
| 7 | SHP401/AS4000 | SHP401/AS4000 | 8.2 ± 0.1 | |
| 8 | SHP470 (thick layer)/ AS4700 | SHP470 (thin layer)/ AS4700 | 3.7 ± 0.1 | |
| 9 | SHP470 (thin layer)/ AS4700 | SHP470 (thick layer)/ AS4700 | <2.3 | brittle fracture at minimal speed |

Sample sheets with UVHC3000 or SHIP470 (thick layer)/AS4700 in the zone subject to tensile forces generally undergo brittle fracture under the conditions chosen, i.e. the critical impact speed is below 2.5 m/s. In contrast, the sheets with SHP 401/AS 4000, SHP470 (thin layer)/AS4700 or with PHC 587 in the zone subject to tensile forces show tough fracture behaviour even at sometimes significantly higher impact speeds, the transition from tough to brittle fracture first taking place here at between 3.3 and 8.2 m/s—depending on the coating system employed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A multi-layer composite comprising:
   (a) a first scratch-resistant coating layer;
   (b) a thermoplastic layer; and
   (c) a second scratch-resistant coating layer;
   wherein the first scratch-resistant coating layer and the second scratch-resistant coating layer are disposed on opposing sides of the thermoplastic layer;
   wherein the first scratch-resistant coating and the second scratch-resistant coating each comprise a top coat layer having a thickness, and wherein the first coating and the second coating differ only in the thicknesses of their top coat layers;
   and wherein the first scratch-resistant coating layer and the second scratch-resistant coating layer are selected such that a multi-layer composite having the first scratch-resistant layer disposed on both sides of the thermoplastic layer has a lower critical impact speed for tough/brittle transition at −30 ° C. according to DIN EN ISO 6603-1 than a multi-layer composite having the second scratch-resistant layer disposed on both sides of the thermoplastic layer.

2. The multi-layer composite according to claim 1, wherein the second scratch-resistant coating layer has an impact speed for tough/brittle transition at −30 ° C. according to DIN EN ISO 6603-1 of greater than 2.5 m/s when the multi-layer composite has a thickness of 5 mm and the second scratch-resistant coating layer is disposed on the side of the thermoplastic layer which is subject to tensile forces during the DIN EN ISO 6603-1 testing.

3. The multi-layer composite according to claim 1, wherein the first coating comprises: one or more compounds selected from the group consisting of organosilicon compounds of the general formula $R'_n Si(OR)_{4-n}$, and partial condensates thereof; an inorganic finely divided compound; an UV absorber; and an alcohol-based solvent.

4. The multi-layer composite according to claim 1, wherein the second coating comprises: one or more compounds selected from the group consisting organosilicon compounds of the general formula $R'_n Si(OR)_{4-n}$, and partial condensates thereof; inorganic nanoparticles; an alcohol-based solvent; an acrylate-based organic adhesion promoter; and, optionally, a UV absorber.

5. The multi-layer composite according to claim 1, further comprising a primer layer disposed between the thermoplastic layer and one or both of the first scratch-resistant coating layer and the second scratch-resistant coating layer.

6. The multi-layer composite according to claim 5, wherein the primer layer or layers comprise polymethyl methacrylate, 1-methoxy-2-propanol, diacetone alcohol and UV absorber.

7. The multi-layer composite according to claim 1, wherein the thermoplastic layer comprises one or more selected from the group consisting of polycarbonates, polyester carbonates, polyesters, polyphenylene ethers, graft copolymers thereof, and mixtures thereof.

8. The multi-layer composite according to claim 1, wherein the thermoplastic layer is injection-molded.

9. A process for producing a multi-layer composite according to claim 1, the process comprising: (i) positioning the thermoplastic layer such that one edge is lower than a higher edge; (ii) flow coating the thermoplastic layer on an upper side of the higher edge with the first coating to form the first scratch-resistant coating layer; (iii) flow coating the thermoplastic layer on an under-side of the higher edge with the second coating to form the second scratch-resistant coating layer; and (iv) drying the first and second scratch-resistant coating layers.

10. The process according to claim 9, wherein the flow coating of the upper side of the higher edge and the flow coating of the under-side of the higher edge are carried out substantially at the same time.

11. The process according to claim 9, wherein the flow coating of the upper side of the higher edge and the flow coating of the under-side of the higher edge are carried out at an interval of from 1 to 30 min.

12. The process according to claim 9, wherein the flow coating of the upper side of the higher edge and the flow coating of the under-side of the higher edge are carried out at an interval of from 1 to 10 min.

13. The process according to claim 9, wherein the flow coating of the upper side of the higher edge and the flow coating of the under-side of the higher edge are carried out at an interval of from 2 to 5 min 14. A glazing component comprising a multi-layer composite according to claim 1.

15. An automotive windshield comprising a multi-layer composite according to claim 1.

16. A multi-layer composite comprising:
   (a) a first scratch-resistant coating layer;
   (b) a thermoplastic layer; and
   (c) a second scratch-resistant coating layer;
   wherein the first scratch-resistant coating layer and the second scratch-resistant coating layer are disposed on opposing sides of the thermoplastic layer;
   wherein the first scratch-resistant coating and the second scratch-resistant coating each comprise a primer layer having a thickness, and wherein the first coating and the second coating differ only in the thicknesses of their primer layers;
   and wherein the first scratch-resistant coating layer and the second scratch-resistant coating layer are selected such that a multi-layer composite having the first scratch-resistant layer disposed on both sides of the thermoplastic layer has a lower critical impact speed for tough/brittle transition at −30° C. according to DIN EN ISO 6603-1 than a multi-layer composite having the second scratch-resistant layer disposed on both sides of the thermoplastic layer.

17. The multi-layer composite according to claim 16, wherein the second scratch-resistant coating layer has an impact speed for tough/brittle transition at −30° C. according to DIN EN ISO 6603-1 of greater than 2.5 m/s when the multi-layer composite has a thickness of 5 mm and the second scratch-resistant coating layer is disposed on the side of the thermoplastic layer which is subject to tensile forces during the DIN EN ISO 6603-1 testing.

18. The multi-layer composite according to claim 16, wherein the first coating comprises: one or more compounds selected from the group consisting of organosilicon compounds of the general formula $R'_n Si(OR)_{4-n}$, and partial condensates thereof; an inorganic finely divided compound; an UV absorber; and an alcohol-based solvent.

19. The multi-layer composite according to claim 16, wherein the second coating comprises; one or more compounds selected from the group consisting organosilicon compounds of the general formula $R'_n Si(OR)_{4-n}$, and partial condensates thereof; inorganic nanoparticles; an alcohol-based solvent; an acrylate-based organic adhesion promoter; and, optionally, a UV absorber.

20. The multi-layer composite according to claim 16, wherein the primer layer or layers comprise polymethyl methacrylate, 1-methoxy-2-propanol, diacetone alcohol and UV absorber.

21. The multi-layer composite according to claim 16, wherein the thermoplastic layer comprises one or more selected from the group consisting of polycarbonates, polyester carbonates, polyesters, polyphenylene ethers, graft copolymers thereof, and mixtures thereof.

22. The multi-layer composite according to claim 16, wherein the thermoplastic layer is injection-molded.

23. A glazing component comprising a multi-layer composite according to claim 16.

24. An automotive windshield comprising a multi-layer composite according to claim 16.

25. A multi-layer composite comprising:
(a) a first scratch-resistant coating layer;
(b) a thermoplastic layer; and
(c) a second scratch-resistant coating layer;
wherein the first scratch-resistant coating layer and the second scratch-resistant coating layer are disposed on opposing sides of the thermoplastic layer;
wherein the first scratch-resistant coating and the second scratch-resistant coating are not the same;
wherein the first coating comprises: one or more compounds selected from the group consisting of UV curing coating systems based on acrylate, urethane acrylate or acrylosilane; photoinitiator; UV absorber; solvent; and optionally an inorganic finely divided compound;
and wherein the first scratch-resistant coating layer and the second scratch-resistant coating layer axe selected such that a multi-layer composite having the first scratch-resistant layer disposed on both sides of the thermoplastic layer has a lower critical impact speed for tough/brittle transition at −30° C. according to DIN EN ISO 6603-1 than a multi-layer composite having the second scratch-resistant layer disposed on both sides of the thermoplastic layer.

26. The multi-layer composite according to claim 25, wherein the second coating comprises: one or more compounds selected from the group consisting organosilicon compounds of the general formula $R'_n Si(OR)_{4-n}$, and partial condensates thereof; inorganic nanoparticles; an alcohol-based solvent; and an acrylate-based organic adhesion promoter; and, optionally, a UV absorber.

27. A glazing component comprising a multi-layer composite according to claim 25.

28. An automotive windshield comprising a multi-layer composite according to claim 25.

* * * * *